United States Patent
Guo et al.

(10) Patent No.: US 12,457,578 B2
(45) Date of Patent: Oct. 28, 2025

(54) METHOD AND APPARATUS FOR TASK MANAGEMENT IN NEXT GENERATION NETWORKS

(71) Applicant: Lenovo (Beijing) Limited, Beijing (CN)

(72) Inventors: Xin Guo, Beijing (CN); Tingfang Tang, Beijing (CN); Lianhai Wu, Beijing (CN); Haiming Wang, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 418 days.

(21) Appl. No.: 18/249,402

(22) PCT Filed: Oct. 20, 2020

(86) PCT No.: PCT/CN2020/122253
§ 371 (c)(1),
(2) Date: Apr. 18, 2023

(87) PCT Pub. No.: WO2022/082447
PCT Pub. Date: Apr. 28, 2022

(65) Prior Publication Data
US 2023/0388964 A1    Nov. 30, 2023

(51) Int. Cl.
*H04W 64/00* (2009.01)
*H04W 36/00* (2009.01)
*H04W 72/543* (2023.01)

(52) U.S. Cl.
CPC ... *H04W 64/006* (2013.01); *H04W 36/00835* (2018.08); *H04W 72/543* (2023.01)

(58) Field of Classification Search
CPC ....... H04W 36/0083; H04W 36/00835; H04W 64/006; H04W 72/543
See application file for complete search history.

(56) References Cited

U.S. PATENT DOCUMENTS 10,499,304 B1 * 12/2019 Stauffer .......... H04W 36/00835
11,197,209 B2 * 12/2021 Guo .................... H04L 67/1012
(Continued)

FOREIGN PATENT DOCUMENTS

| CN | 101025623 A | 8/2007 |
|----|-------------|--------|
| CN | 107924336 A | 4/2018 |

(Continued)

OTHER PUBLICATIONS

3GPP TS 23.502v16.5.0. "3rd Generation Partnership Project; Technical Specification Group Services and System Aspects; Procedures for the 5G System (5GS); Stage 2 (Release 16)" Jul. 2020. (Year: 2020).*

(Continued)

*Primary Examiner* — Stephen J Clawson
(74) *Attorney, Agent, or Firm* — FIG. 1 Patents

(57) ABSTRACT

Embodiments of the present application relate to a method and an apparatus for task management in next generation networks (NGNs). According to an embodiment of the present application, a method can include: receiving a request message for requesting candidate configuration of a task result feedback (TRF) on a task associated with a UE; transmitting a task status report configuration to a first edge data network (EDN), wherein the first EDN includes a server to perform the task; and receiving a task status report associated with the task from the first EDN. Embodiments of the present application can efficiently satisfy the quality of service (QoS) or quality of experience (QoE) requirements (such as latency, energy, computational capability and so on) of a UE during a handover procedure.

20 Claims, 5 Drawing Sheets

(56) References Cited

U.S. PATENT DOCUMENTS

| | | | | |
|---|---|---|---|---|
| 11,762,743 | B2* | 9/2023 | Wang | G06F 11/2048 714/4.11 |
| 2007/0217619 | A1 | 9/2007 | Hall et al. | |
| 2019/0191341 | A1* | 6/2019 | Trang | H04W 4/50 |
| 2019/0342797 | A1* | 11/2019 | Fu | H04L 41/5009 |
| 2020/0154459 | A1* | 5/2020 | Mukherjee | H04W 72/535 |
| 2020/0267084 | A1* | 8/2020 | Hande | H04L 47/283 |
| 2020/0336940 | A1* | 10/2020 | Salkintzis | H04W 28/0942 |
| 2020/0351724 | A1* | 11/2020 | Guo | H04W 36/0064 |
| 2021/0014734 | A1* | 1/2021 | Liu | H04W 28/0942 |
| 2021/0136620 | A1* | 5/2021 | Laitila | H04W 28/06 |
| 2021/0351997 | A1* | 11/2021 | Luft | H04L 43/16 |
| 2022/0053602 | A1* | 2/2022 | Kim | H04L 5/0055 |
| 2022/0361038 | A1* | 11/2022 | Kim | H04W 28/0942 |
| 2023/0008647 | A1* | 1/2023 | Yao | H04W 76/10 |
| 2023/0014613 | A1* | 1/2023 | Je | H04W 36/0061 |
| 2023/0074288 | A1* | 3/2023 | Filippou | H04L 47/127 |
| 2023/0396954 | A1* | 12/2023 | Zhang | H04W 4/022 |
| 2024/0314592 | A1* | 9/2024 | Wang | H04W 24/02 |

FOREIGN PATENT DOCUMENTS

| | | |
|---|---|---|
| CN | 111314464 A | 6/2020 |
| WO | 2020180217 A1 | 9/2020 |
| WO | 2020197288 A1 | 10/2020 |

OTHER PUBLICATIONS

R3-213471. 3GPP TSG-RAN WG3 Meeting #113-e. "AI/ML based mobility optimization" Intel Corporation. Electronic Meeting. Aug. 16-26, 2021. (Year: 2021).*

R3-230626. 3GPP TSG-RAN WG3 Meeting#119. "Discussion on mobility optimization" Intel Corporation. Athens, Greece. Feb. 27-Mar. 2023. (Year: 2023).*

"Technical Specification Group Services and System Aspects; Study on enhancement of support for Edge Computing", 3GPP TR 23.748 V0.5.0 [retrieved May 22, 2023]. Retrieved from the Internet <https://portal.3gpp.org/desktopmodules/Specifications/SpecificationDetails.aspx?specificationId=3622>., Sep. 2020, 58 Pages.

PCT/CN2020/122253, "International Preliminary Report on Patentability", PCT Application No. PCT/CN2020/122253, May 4, 2023, 5 pages.

PCT/CN2020/122253, "International Search Report and Written Opinion", PCT Application No. PCT/CN2020/122253, Jul. 27, 2021, 6 pages.

20958030.7, "European Search Report", Application No. 20958030.7, Jun. 27, 2024, 34 pages.

Multiaccess Edge Computing (MEC), "European Search Report", Draft ETSI GR MEC 031 V2.0.21 MEC 5G Integration 650, Route Des Lucioles ; F-06921 Sophia-Antipolis; France ; URL:docbox.etsi.org/ISG/MEC/70-Draft/0031/MEC00315Gintegrationv2021/MEC-00315Gintegrationv2021 changemarks.docx, Sep. 2020, 47 pages.

* cited by examiner

METHOD AND APPARATUS FOR TASK MANAGEMENT IN NEXT GENERATION NETWORKS

TECHNICAL FIELD

Embodiments of the present application generally relate to wireless communication technology, especially to a method and apparatus for task management in next generation networks (NGNs).

BACKGROUND

Based on current study items in 3GPP, it is apparently a tendency for the NGN to be integrated with AI technologies. AI is expected as an enabling technology to conduct intelligent management, control and diagnostics for complicated network envisaged by the NGN. On the other hand, AI-based applications are developing quickly to fulfill the ever-increasingly challenging demands of mobile end users, e.g., a user equipment (UE) in the NGN.

The NGN with AI technologies may need to run a large number of applications and perform large-scale computations. Due to the limited computational capability, storage and battery life of the mobile devices, task offloading is introduced in the NGN to augment the computing capability of less powerful devices.

Given the above, the industry desires an improved technology for task management in NGNs, so as to efficiently satisfy the quality of service (QoS) or quality of experience (QoE) requirements of a UE in a handover procedure.

SUMMARY OF THE APPLICATION

Some embodiments of the present application at least provide a technical solution for task management in NGNs.

According to some embodiments of the present application, a method may include: receiving a request message for requesting candidate configuration of a task result feedback (TRF) on a task associated with a UE; transmitting a task status report configuration to a first edge data network (EDN), wherein the first EDN includes a server to perform the task; and receiving a task status report associated with the task from the first EDN.

In an embodiment of the present application, the method may be performed by a standalone predicted session management function (PSMF) or by a session management function (SMF).

In an embodiment of the present application, the request message may include at least one of: an identity (ID) of the UE; an ID of a session associated with the task; a cell ID of at least one candidate handover (HO) cell for the UE; a type field indicating a type of handover; and a maximum number of candidate configurations.

In an embodiment of the present application, the type of handover may indicate one of the followings: a target HO cell is determined by a PSMF or a SMF; a target HO cell is determined by a source cell; a target HO cell is determined by the UE; and a target HO cell is determined by a source cell based on an HO request acknowledge considering the candidate configuration for TRF of each candidate HO cell.

In an embodiment of the present application, the task status report configuration may indicate the task on the server to be measured, content included in the task status report, and a reporting criterion of the task status report.

In an embodiment of the present application, the task status report may include at least one of: a timestamp for the task status report; a time duration between the timestamp for the task status report and the end of the task; one or more Quality of service (QoS) requirements for the TRF, wherein the one or more QoS requirements include at least one of: a maximum requested time associated with reception of the TRF by the UE; a requested time duration associated with reception of the TRF by the UE; and reliability for the TRF.

In an embodiment of the present application, the method may further include: transmitting a performance data request message for requesting a performance data, wherein the performance data request message indicates at least one of: a criterion for the TRF, requested information in the performance data, and a maximum number of information elements included in the requested information; and receiving the performance data including the requested information.

In an embodiment of the present application, the criterion for the TRF includes at least one of: a cell ID of at least one candidate HO cell for the UE; an ID of the server; latency criteria of the TRF; reliability criteria of the TRF; an application type of the task; and an expected end time of the task.

In an embodiment of the present application, the method may further include: determining a first set of candidate configurations of the TRF based on the performance data, wherein each of the first set of candidate configurations indicates how to provide the TRF on the task to the UE via a corresponding candidate HO cell of the at least one candidate HO cell.

In an embodiment of the present application, the method may further include: in response to the first set of candidate configurations not associated with a second EDN, determining a second set of candidate configurations based on the performance data, the task status report, and the type of handover indicated in the request message.

In an embodiment of the present application, the method may further include: in response to the first set of candidate configurations associated with at least one second EDN: for each candidate configuration of the TRF in the first set of candidate configurations of the TRF which is associated with a corresponding second EDN: transmitting a task transfer request message including the information of the task to a corresponding second EDN associated with the candidate configuration; and receiving a task transfer response message from the corresponding second EDN; and determining a second set of candidate configurations of the TRF based on the performance data, the task status report, the type of handover indicated in the request message, and the task transfer response message from each second EDN.

In an embodiment of the present application, the method may further include: transmitting the second set of candidate configurations of the TRF.

In an embodiment of the present application, the method may further include: receiving a selected configuration of the TRF, wherein the selected configuration of the TRF is one of the second set of candidate configurations of the TRF; and updating a task status to include the selected configuration of the TRF; and transmitting the selected configuration of the TRF to the first EDN and/or a second EDN.

According to some other embodiments of the present application, a method may include: receiving a task status measurement and reporting configuration, wherein the task status measurement and reporting configuration indicates a first task on a server to be measured, content included in a task status report, and a reporting criterion of a task status report, where the first task is associated with a UE; and in response to the task status measurement and reporting configuration, transmitting a task status report associated with the first task.

In an embodiment of the present application, the task status report may include at least one of: a timestamp for the task status report; a time duration between the timestamp for the task status report and the end of the first task; one or more QoS requirements for the TRF, wherein the one or more QoS requirements include at least one of: a maximum requested time associated with reception of the TRF by the UE; a requested time duration associated with reception of the TRF by the UE; and reliability for the TRF.

In an embodiment of the present application, the method may further include: receiving a selected configuration of a TRF, wherein the selected configuration of the TRF indicates how to provide the TRF on the first task from the server to the UE via a target cell; updating a task status of the first task; and determining a task scheduling strategy based on the selected configuration.

In an embodiment of the present application, the method may further include: obtaining a performance data associated with the selected configuration of the TRF; and determining a task scheduling strategy for the server based on the selected configuration of the TRF and the performance data.

In an embodiment of the present application, the performance data may include at least one of: latency criteria of the selected configuration of the TRF; reliability criteria of the selected configuration of the TRF; and an application type of the task.

In an embodiment of the present application, the task scheduling strategy includes at least one of: a priority of the task; a computing resource of the task; and a storage resource of the task.

In an embodiment of the present application, the method may further include: receiving a task transfer request message including information of a second task, wherein the information of the second task include at least one of: candidate configuration of TRF associated with the second task, QoS requirements for operating the second task, and QoS requirements for TRF associated with the second task; performing a task admission control based on the information included in the task transfer request message; and transmitting a task transfer response message to indicate if the task transfer request message is accepted or rejected.

In an embodiment of the present application, the method may further include: receiving a session establishment message; perform a session establishment procedure to generate a task transfer routing in response to the session establishment message; receiving information of a second task via the task transfer routing; and updating a task queue of predicted tasks based on the information of the second task.

According to some other embodiments of the present application, a method may include: receiving a first performance data request message, wherein the first performance data request message indicates at least one of: a criterion for a TRF on a task performed on a server, requested information in the performance data, and a maximum number of information elements included in the requested information; and in response to the first performance data request message, transmitting a first performance data including the requested information.

In an embodiment of the present application, the criterion for the TRF includes at least one of: a cell identity (ID) of at least one candidate HO cell for the UE; an ID of the server; latency criteria of the TRF; reliability criteria of the TRF; an application type of the task; and an expected end time of the task.

In an embodiment of the present application, the method may further include: in response to receiving the first performance data request message, performing a data analysis based on the first performance data request message to identify the requested information which meets the criterion for the TRF.

In an embodiment of the present application, the method may further include: receiving a second performance data request message, wherein the second performance data request message includes a selected configuration of the TRF; and transmitting a second performance data associated with the selected configuration of the TRF, wherein the second performance data includes at least one of: latency criteria of the selected configuration of the TRF; reliability criteria of the selected configuration of the TRF; and an application type of the task.

Some embodiments of the present application also provide an apparatus, include: at least one non-transitory computer-readable medium having computer executable instructions stored therein; at least one receiving circuitry; at least one transmitting circuitry; and at least one processor coupled to the at least one non-transitory computer-readable medium, the at least one receiving circuitry and the at least one transmitting circuitry. The computer executable instructions are programmed to implement any method as stated above with the at least one receiving circuitry, the at least one transmitting circuitry and the at least one processor.

Embodiments of the present application provide a technical solution for task management in NGNs, which can efficiently satisfy the QoS or QoE requirements (such as latency, energy, computational capability and so on) of a UE during a handover procedure.

BRIEF DESCRIPTION OF THE DRAWINGS

In order to describe the manner in which advantages and features of the application can be obtained, a description of the application is rendered by reference to specific embodiments thereof, which are illustrated in the appended drawings. These drawings depict only example embodiments of the application and are not therefore to be considered limiting of its scope.

DETAILED DESCRIPTION

The detailed description of the appended drawings is intended as a description of the currently preferred embodiments of the present application and is not intended to represent the only form in which the present application may be practiced. It is to be understood that the same or equivalent functions may be accomplished by different embodiments that are intended to be encompassed within the spirit and scope of the present application.

Reference will now be made in detail to some embodiments of the present application, examples of which are illustrated in the accompanying drawings. To facilitate understanding, embodiments are provided under specific network architecture and new service scenarios, such as 3GPP 5G (i.e., NR), 3GPP LTE Release 8 and so on. Persons skilled in the art know very well that, with the development of network architecture and new service scenarios, the embodiments in the present application are also applicable to similar technical problems.

The NGN with AI technologies may need to run a large number of applications and perform large-scale computations. Due to the limited computational capability, storage and battery life of the mobile devices, it is almost impossible for mobile devices to satisfy stringent demands required by AI-based applications, which are characterized by latency-sensitive and compute-intensive. To this end, computation offloading, a computing paradigm, is introduced in the NGN.

A basic design principle of computation offloading is to leverage powerful infrastructures (e.g., remote servers) to augment the computing capability of less powerful devices (e.g., mobile devices). For example, the computation offloading may include edge-oriented computation offloading and cloud-oriented computation offloading. The edge-oriented computation offloading outperforms the cloud-oriented computation offloading in terms of balance between latency and computational capability.

Figure 1:
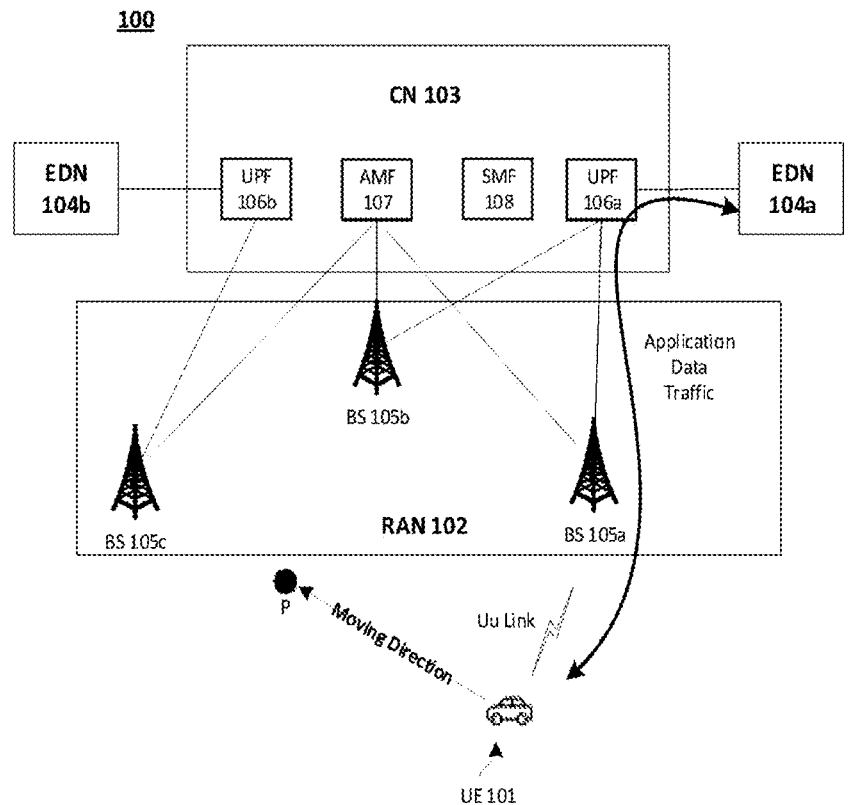
FIG. 1 is a schematic diagram illustrating an exemplary wireless communication system 100 according to an embodiment of the present application.

FIG. 1 is a schematic diagram illustrating an exemplary wireless communication system 100 according to an embodiment of the present application.

As shown in FIG. 1, the wireless communication system 100 may include at least one UE (e.g. UE 101), at least one radio access network (e.g., RAN 102), at least one core network (CN) (e.g., CN 103), and at least one edge data network (EDN) (e.g., EDN 104a and EDN 104b).

The RAN 102 may include at least one BS (e.g., BS 105a, BS 105b, and BS 105c). The CN 103 may include at least one user plane function (UPF) (e.g., UPF 106a and UPF 106b), an access and mobility management function (AMF) 107, and a session management function (SMF) 108.

Although three BS s, one UE, two UPFs and two EDNs are illustrated in FIG. 1 for simplicity, it is contemplated that the wireless communication system 100 may include more or less BS, UE, UPF, and EDN in some other embodiments of the present application.

The BS may also be referred to as an access point, an access terminal, a base station, a macro cell, a node-B, an enhanced node B (eNB), a gNB, a home node-B, a relay node, or a device, or described using other terminology used in the art. The BS is generally part of a radio access network that may include a controller communicably coupled to the BS.

The UE may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, or the like. According to an embodiment of the present application, UE may include a portable wireless communication device, a smart phone, a cellular telephone, a flip phone, a device having a subscriber identity module, a personal computer, a selective call receiver, or any other device that is capable of sending and receiving communication signals on a wireless network. In some embodiments, UE may include wearable devices, such as smart watches, fitness bands, optical head-mounted displays, or the like. In some embodiments, UE may include vehicles. Moreover, UE may be referred to as a subscriber unit, a mobile, a mobile station, a user, a terminal, a mobile terminal, a wireless terminal, a fixed terminal, a subscriber station, a user terminal, or a device, or described using other terminology used in the art.

The UPF is general responsible for user plane processing. The UPF is mainly responsible for performing all UPFs on the packets, such as forwarding, routing, quality of service (QoS), and so on.

The EDN may include an edge node (EN), a content server, a cloud server, or any other server which can run task such as associated with a UE. The task associated with a UE may be offloaded to the EDN from the UE or from the network.

The AMF is part of the control plane processing on the core network side. The AMF receives the non-access stratum (NAS) signaling from the UE via the RAN and is also connected to the BS for control plane signaling between the RAN and the CN. The AMF is mainly responsible for connection management, mobility management, and so on. The AMF provides transport and proxying for session management (SM) messages between the UE and the SMF.

The SMF is mainly responsible for session management, such as session establishment, modification, and release, including maintenance of the tunnel between the UPF and the BS.

The wireless communication system 100 is compatible with any type of network that is capable of sending and receiving wireless communication signals. For example, the wireless communication system 100 is compatible with a wireless communication network, a cellular telephone network, a time division multiple access (TDMA)-based network, a code division multiple access (CDMA)-based network, an orthogonal frequency division multiple access (OFDMA)-based network, an LTE network, a 3GPP-based network, a 3GPP 5G network, a satellite communications network, a high altitude platform network, and/or other communications networks.

Considering mobility is an inherent characteristic of UEs, how to design efficient mobility management is challenging for supporting task offloading in the context of edge-oriented task offloading, where EDNs are geo-distributed.

Taking the scenario depicted in FIG. 1 as an example, the UE 101 may be currently served by a source BS (e.g., BS 105a). For application data traffic being in progress for UE 101, at least one task (e.g., computation task) of the application data traffic may be offloaded to EDN 104a via BS 105a and the UPF 106a, as illustrated by bold curve with arrows. UE 101 keeps moving along the direction indicated by the dotted line arrow. When UE 101 moves to the location denoted by P, a handover (HO) decision may be triggered by BS 105*a* based on measurement reports from UE 101. According to an HO procedure specified in 3GPP, the target BS will be determined by the source BS (e.g., BS 105*a*) based on the measurement report from UE 101 and handover request acknowledge from at least one candidate BS (e.g., BS 105*b* and BS 105*c*).

In the existing HO procedure, service continuity or session continuity has been guaranteed for legacy data access by utilizing a method such as data forwarding. For example, for legacy data access, the data buffered in the source BS will be delivered from the source BS to a determined target BS during the HO execution phase.

However, task offloading differs from the legacy data access in the pattern of resource utilization as well as QoS or QoE requirements, and thus requires distinct information for target BS determination in the HO procedure. For example, for the task offloading, the task may be not required to be delivered during the HO execution phase. Therefore, for different target BS, when and how the task result feedback will be transmitted from the EDN 104*a* via the target BS to UE 101 is different.

For example, if BS 105*b* is determined to be the target BS of UE 101, the task result feedback may be transmitted to UE 101 via a path from EDN 104*a* to UPF 106*a* to BS 105*b* once the task result is obtained by the EDN 104*a*.

If BS 105*c* is determined to be the target BS of UE 101, the task result feedback may be transmitted to UE 101 via one of two alternative paths once the task result is obtained by EDN 104*a*. The first path may be from EDN 104*a* to UPF 106*a* to UPF 106*b* and then to BS 105*c*. The second path may be from EDN 104*a* to UPF 103*a* to BS 101*c*. Alternatively, the task can be transferred to and performed in EDN 104*b* (which is closer to BS 105*c*) and the task results once obtained by the EDN 104*b* will be delivered to UE 101 via a path from EDN 104*b* to UPF 106*b* to BS 105*c*.

Given the above, different determined target BS s in the HO procedure will require different cost to the system when performing task transfer and task result feedback, and thus introduce different QoS or QoE (for example, energy, computational capability and so on) required for the task results to be obtained by the UE. Therefore, the determination of target BS in the HO procedure should consider the connection between the EDN and target BS, thereby satisfying the performance for performing task result feedback to the UE. Accordingly, how to determine such an expected connection between EDN and candidate target BS(s) and how to utilize such information into further management of the offloaded task operation need to be further studied.

Given the above, embodiments of the present application provide a technical solution for task management in NGNs, which can efficiently guarantee QoS or QoE requirements (for example, latency, energy, computational capability and so on) of a TRF when a UE associated with the task is involved in a handover procedure, by considering an expected configuration (e.g., routing) of TRF into a handover target selection as well as considering the expected configuration into management of a succeeding task operation. More details on embodiments of the present application will be illustrated in the following text in combination with the appended drawings.

Figure 2:
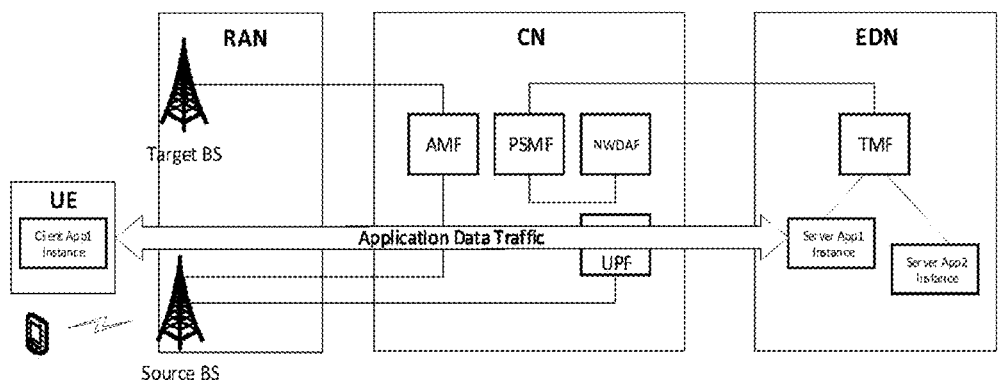
FIG. 2 illustrates an exemplary network architecture for task management in NGNs according to some embodiments of the present application.

FIG. 2 illustrates an exemplary network architecture for task management in NGNs according to some embodiments of the present application.

As shown in FIG. 2, the network architecture may include a UE, a RAN, a CN, and an EDN. The RAN may include two BS, for example, a source BS and a target BS. The source BS may be a serving BS of the UE and the target BS is the BS to which UE may perform handover. The BS may also be referred to as a RAN node in some embodiments of the present application.

The CN may include an AMF, a UPF, a network data analytics function (NWDAF), and a predicted session management function (PSMF). The AMF and UPF may have the same functions as those in FIG. 1. The NWDAF may be used for analysis of network slicing related data as specified in 3GPP standard documents. The PSMF may be a new network function deployed in the core network. In other words, the PSMF can be implemented as a standalone network function. Alternatively, the PSMF can be implemented as new functionalities added to a legacy SMF as illustrated in FIG. 1. The key functionality of the PSMF is to provide a predicted session management, such as predicted session determination, confirmation, modification, release, and so on. The following embodiments of the present application employ PSMF as an example to illustrate the disclosure. The described disclosure can be applied to the case when PSMF is implemented as new functionalities added to SMF.

The EDN may include a server (not shown in FIG. 2) and a task management function (TMF). The server may be used to perform a task associated with a session of a UE which is offloaded into the EDN. The TMF may be a new network function deployed in the EDN. The key functionality of the TMF is to provide task management, such as task identification, task status collecting, task operation controlling and scheduling, and so on.

For a task associated with a session of the UE which is offloaded to the EDN, the UE side may initiate a client application instance (e.g., client app 1 instance) associated with the session and the server side may initiate a server application instance (e.g., server app 1 instance) associated with the session. The application data traffic of the session may be transmitted between the corresponding client application instance and the server application instance.

Referring to FIG. 2, if a UE which is determined to perform handover (HO) is associated with an offloaded task in the EDN, at least one RAN node associated with the UE may request candidate configuration(s) of a TRF during the HO procedure. The RAN node may be either a source RAN node for the UE or one or more candidate HO target RAN nodes for the UE. The RAN node can be such as a BS, eNB, gNB, ng-eNB, and so on.

The candidate configuration(s) of a TRF may be determined by the PSMF in the CN based on task status report obtained from the TMF and performance data between a server in the EDN where the task is performed and a candidate HO target RAN node obtained from the NWDAF. After determining the candidate configuration(s) of a TRF, the PSMF may transmit the candidate configuration(s) of a TRF to the RAN node.

If a configuration for TRF is selected along with the target HO RAN node (cell), the selected configuration will be in turn reported to the core network and delivered to the TMF for management of the succeeding task operation.

Figure 3:
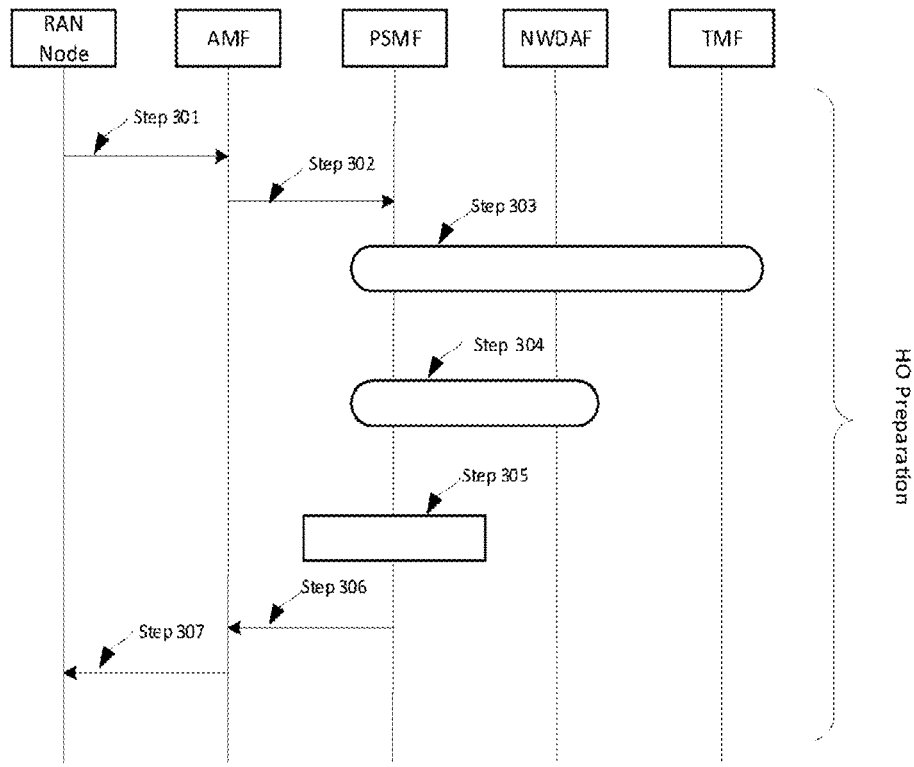
FIG. 3 is a flow chart illustrating a method for task management in NGNs according to some embodiments of the present application.

FIG. 3 is a flow chart illustrating a method for task management in NGNs according to some embodiments of the present application;

The method in FIG. 3 may include seven steps. All of the seven steps may occur in a HO preparation stage.

Referring to FIG. 3, in step 301, a RAN node (e.g., a BS) involved in a HO procedure for a UE may transmit a request message for requesting candidate configuration of a TRF on a task to an AMF connected to the RAN node. The task may be associated with a UE (e.g., UE 101) and may be performed on a server of an EDN not shown in FIG. 3.

The request message may include at least one of: an ID of the UE, an ID of a session (e.g., protocol data unit (PDU) session) associated with the task, a cell ID of at least one candidate HO cell for the UE, a type field indicating a type of handover; and a maximum number of candidate configurations to be requested.

In an embodiment of the present application, the RAN node may be a source BS, then the request message may include cell IDs of all candidate HO cells determined by the source BS for the UE based on measurement result from the UE.

In another embodiment of the present application, the RAN node may be a candidate HO BS, and the request message may include a cell ID of a candidate HO cell associated with the candidate HO BS.

In yet another embodiment of the present application, the type of handover may indicate one of the followings: a target HO cell is determined by a PSMF; a target HO cell is determined by a source cell; a target HO cell is determined by the UE; and a target HO cell is determined by a source cell based on HO request acknowledge considering the candidate configuration for TRF of each candidate HO cell.

In some embodiments, the offloaded task of the UE may include one session performed in one EDN. In some embodiments, the offloaded task may include multiple sessions performed in one EDN. In some embodiments, the offloaded task may include multiple sessions performed in multiple EDNs. That is, an associated EDN may perform at least one session of the multiple sessions. Embodiments of the present application employ one PDU session performed in one EDN to illustrate the disclosure. In case of multiple PDU sessions, the offloaded task may be handled in different ways. In some embodiments, each of the PDU sessions can be handled respectively. For example, the information included in each operation may be generated per session, and the candidate configuration of the TRF may be generated per session. In some embodiments, the multiple PDU sessions can be handled in the unit of END.

After receiving the request message, in step 302, the AMF may deliver the request message to a PSMF. In the case that the PSMF is implemented as a standalone network function in the core network, the AMF may deliver the request message to the PSMF. In the case that the PSMF is implemented as new functionalities added to a legacy SMF, the AMF may deliver the request message to a SMF including the new functionalities of the PSMF.

After receiving the request message, based on the session ID and the UE ID, the PSMF may identify an EDN in which the task associated with the session is performed on a server of the EDN. Then, in step 303, the PSMF may obtain a task status report associated with the task from the EDN (e.g., from a TMF in the EDN). The specific procedure for obtaining the task status report in step 303 may be illustrated in FIG. 4.

Figure 4:
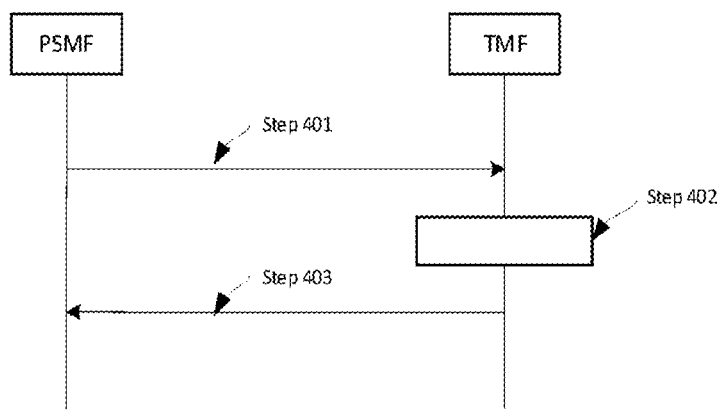
FIG. 4 illustrates a flow chart for obtaining a task status report according to some embodiments of the present application.

For example, FIG. 4 illustrates a flow chart for obtaining a task status report according to some embodiments of the present application. The steps 401, 402, and 403 in FIG. 4 may be included in step 303 of FIG. 3.

Referring to FIG. 4, in step 401, the PSMF may transmit a task status measurement and reporting configuration to the TMF. The task status measurement and reporting configuration may indicate the task on the server to be measured, content included in the task status report, and a reporting criterion of the task status report.

According to some embodiments of the present application, the task status report includes at least one of: a timestamp for the task status report; a time duration between the timestamp for the task status report and the end of the task; one or more QoS requirements for the TRF, wherein the one or more QoS requirements include at least one of: a maximum requested time associated with reception of the TRF by the UE; a requested time duration associated with reception of the TRF by the UE; and reliability for the TRF.

In an embodiment of the present application, the maximum requested time associated with reception of the TRF by the UE may be a time t, wherein the task result should be received by the UE no later than the time t. That is, the task results should be received by the UE before the time t.

In an embodiment of the present application, a requested time duration associated with reception of the TRF by the UE may be a time duration of [t−Δt, t+Δt]. That is, the task results should be received by the UE at a request time t with a jitter of Δt. In other words, the task results should be received by the UE within the time duration of [t−Δt, t+Δt].

According to some embodiments of the present application, the reporting criterion of the task status report may be an on-demand reporting or a periodic reporting.

After receiving the task status measurement and reporting configuration, in step 402, the TMF may label a server app instance associated with the task in a server which performs the task, perform measurement on the task according to the task status measurement and reporting configuration to obtain the required task status report.

In step 403, the TMF may transmit the task status report to the PSMF. The task status report may include the content indicated by the task status measurement and reporting configuration. In the case that the task status measurement and reporting configuration indicates the on-demand reporting, the TMF may transmit the task status report once in response to the task status measurement and reporting configuration. In the case that the task status measurement and reporting configuration indicates the periodic reporting, the TMF may transmit the task status report periodically based on a predefined period or based on a period indicated in the task status measurement and reporting configuration.

Referring to FIG. 3, after receiving the task status report in the step 303, in step 304, the PSMF may obtain performance data from the NWDAF. The specific procedure for obtaining performance data in step 4 may be illustrated in FIG. 5.

Figure 5:
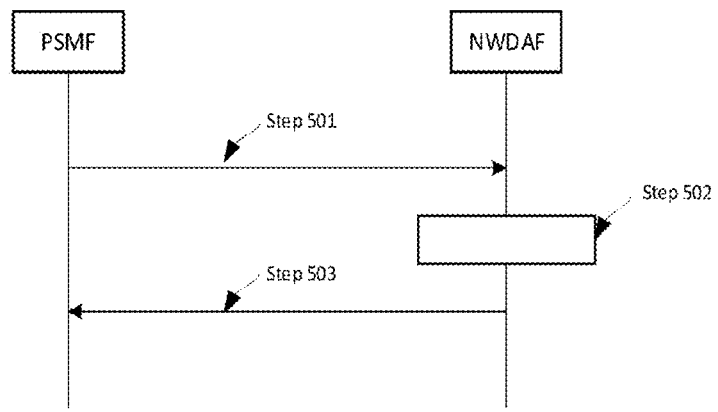
FIG. 5 illustrates a flow chart for obtaining performance data according to some embodiments of the present application.

For example, FIG. 5 illustrates a flow chart for obtaining performance data according to some embodiments of the present application. The steps 501, 502, and 503 in FIG. 5 may be included in step 304 of FIG. 3.

Referring to FIG. 5, in step 501, the PSMF may transmit a performance data request message for requesting a performance data to the NWDAF. The performed data request message may be generated based on the task status report. The performance data request message may indicate at least one of: a criterion for the TRF, requested information in the performance data, and a maximum number of information elements included in the requested information.

In an embodiment of the present application, the criterion for the TRF may include at least one of: a cell ID of at least one candidate HO cell for the UE; an ID of the server; latency criteria of the TRF; reliability criteria of the TRF; an application type of the task; and an expected end time of the task.

In an embodiment of the present application, the request information may include a routing of the TRF. The routing may indicate how the TRF may be transmitted to the UE from the server which performs the task via a candidate HO cell.

After receiving the performance data request message, in step 502, the NWDAF may perform a data analysis based on the performance data request message to identify the requested information which meets the criteria for the TRF. The data analysis may be implemented by performing a lookup in a table which includes performance data or may be implemented by using other technologies, for example, AI-based technologies to analyze the performance data.

For example, the performance data can be collected by and stored in the NWDAF in the form of the following Table 1.

TABLE 1

| Session Index | Cell ID for RAN | Server ID | Routing | Application Type | Latency Criteria | Reliability Criteria | Timestamp of the Reporting |
|---|---|---|---|---|---|---|---|
| Session#0 | Cell ID #0 | Serve ID #0 | Routing #0 | appType #0 | Latency #0 | Reliability #0 | Timestamp#0 |
| Session#1 | Cell ID #1 | Serve ID #1 | Routing #1 | appType #1 | Latency #1 | Reliability #1 | Timestamp#1 |
| ... | ... | ... | ... | ... | ... | ... | ... |
| Session#N-1 | Cell ID #N-1 | Serve ID # N-1 | Routing # N-1 | appType # N-1 | Latency # N-1 | Reliability # N-1 | Timestamp# N-1 |

Referring to table 1, it may include N entries, wherein N is a positive integer. Each entry may include information associated with a corresponding session.

For example, the first entry may include the following information associated with a session indicated by session #0: cell ID #0 indicating a candidate HO cell associated with the session; serve ID #0 indicating a server on which the session (in other words, the task associated with the session) is performed; routing #0 indicating a routing for transmitting the results of the session to the UE via the candidate HO cell indicated by Cell ID #0; appType #0 indicating an application type of the session; latency #0 indicating a latency of the routing indicated by the routing #0; reliability #0 indicating a reliability of the routing indicated by the routing #0; and timestamp #0 indicating a timestamp for obtaining the routing indicated by the routing #0.

Similarly, the second entry may include the information associated with a session indicated by session #1, . . . , the N-th may include the information associated with a session indicated by session #N-1. Persons skilled in the art can understand that "#0," "#1," . . . , and "#N-1" may not be the ID of the session, while may refer to the index of a session in the sequence of sessions in table 1.

In an embodiment of the present application, in the case that the data analysis is implemented by performing a lookup in the example of table 1, after receiving the performance data request message from the PSMF, the NWDAF may use the criterion for TRF as an input to perform a lookup in table 1 so as to obtain the routing information as the requested information.

In another embodiment of the present application, in the case that the data analysis is implemented by AI-based technologies, the existing performance data (such as table 1) may work as training data for the data analysis to generate analysis model. After receiving the performance data request message from PSMF, then NWDAF use the criterion for TRF contained in the request message as input to the analysis model and obtain the output of routing information as the requested information. The analysis model can be such as supervising model, regression model, classification model, unsupervised model, data mining mode, and so on.

After identifying the requested information, in step 503, the NWDAF may transmit the performance data including the requested information to the PSMF. The number of the information elements included in the requested information may be less than or equal to the maximum number of information elements indicated by the performance data request message. In the case that the number of identifies information elements is larger than the maximum number, how to select the information elements may be based on the implementation of the NWDAF. For example, the NWDAF may determine the information elements based on their QoS parameters or based on their timestamps.

For example, assuming that the request information is routing information and the maximum number of information elements indicated by the performance data request message is 10, then the number of routings transmitted in the performance data is less than or equal to 10. In the case that the number of identified routings is larger than 10, the NWDAF may select 10 routing have the better QoS parameters (e.g., reliability, latency, and so on) or select 10 routings which have later timestamps (i.e., the newer routings).

Referring to FIG. 3, after receiving the performance data from the NWDAF, in step 305, the PSMF may determine a first set of candidate configurations of the TRF satisfying the QoS of the TRF based on the performance data. Each of the first set of candidate configurations may indicate how to provide the TRF on the task from the server to the UE via a corresponding candidate cell of the at least one candidate cell. The first set of candidate configuration may include one or more candidate configurations of the TRF. In an embodiment of the present application, the first set of candidate configuration may include one or more routings included in the performance data.

In an embodiment of the present application, in response to the first set of candidate configurations not associated with a new EDN different from the EDN performing the task, the PSMF may determine a second set of candidate configurations based on the performance data, the task status report, the type of handover indicated in the request message, and the maximum number of candidate configurations.

In another embodiment of the present application, in response to the first set of candidate configurations associated with at least one new EDN different from the EDN performing the task, the PSMF may need to confirm with newly involved EDN(s) if the task with the desired QoS of TRF can be served by the newly involved EDN(s). A newly involved EDN can also be referred as a target EDN. The specific procedure may be illustrated in FIG. 6.

Figure 6:
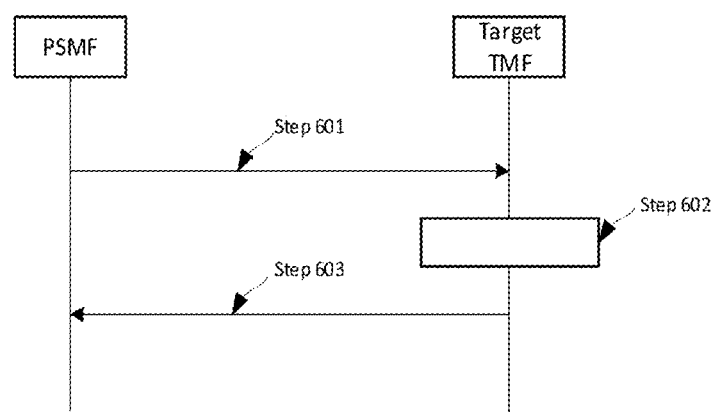
FIG. 6 illustrates a flow chart for obtaining task transfer response according to some embodiments of the present application.

For example, FIG. 6 illustrates a flow chart for obtaining task transfer response according to some embodiments of the present application. The steps 601, 602, and 603 in FIG. 6 may be included in step 305 of FIG. 3.

Referring to FIG. 6, for each candidate configuration in the first set of candidate configurations associated with a target EDN, in step 601, the PSMF may transmit a task transfer request message including information of the task to the target TMF of the target EDN. The information of task may include at least one of: candidate configuration of the TRF associated with the target EDN, QoS requirements for operating the task, and QoS requirements for the TRF associated with the task.

After receiving the task transfer request message, in step 602, the target TMF may perform task admission control based on the information provided in the task transfer request message, so as to determine whether a task transfer request should be accepted or rejected. The decision may be made according to whether the QoS requirements can be satisfied. How to do the admission control can be based on the TMF implementation.

Then, in step 603, the target TMF may transmit a task transfer response message to the PSMF to indicate if the task transfer request is accepted or rejected.

After receiving the task transfer response message from each target TMF (or target EDN), the PSMF may determine a second set of candidate configurations of the TRF based on the performance data, the task status report, the type of handover indicated in the request message, the task transfer response message from each target TMF, and the maximum number of candidate configurations.

In the above two embodiments, the second set of candidate configurations may be a subset of the first set of candidate configurations. The number of the candidate configurations included in the second set of candidate configurations may be determined based on the type of handover and no larger than the maximum number of candidate configurations indicated in the request message.

In some embodiments, in the case that the type of handover indicates that a target HO cell is determined by the PSMF, the second set of candidate configuration may only include one candidate configuration of the TRF. That is, the PSMF determines only one candidate configuration for the HO procedure, then the source RAN and UE will perform HO selection based on the only one candidate configuration. For example, if the candidate configuration indicates a target HO cell, then the UE will perform HO to the target HO cell.

In some embodiments, in the case that the type of handover indicates that a target HO cell is determined by a source cell, the second set of candidate configuration may include at least one candidate configuration of the TRF. That is, the PSMF determines at least one candidate configuration for the HO procedure and sends back to the source BS of the UE. Then the source BS may determine a target HO cell based on the at least one candidate configurations and a HO request acknowledge obtained from each candidate HO cell.

In some embodiments, in the case that the type of handover indicates that a target HO cell is determined by the UE, the second set of candidate configuration may include at least one candidate configuration of the TRF. That is, the PSMF determines at least one candidate configuration for the HO procedure and send back to the UE via the source RAN. Then the UE will determine a target HO based on the candidate configuration and the HO request acknowledge obtained from candidate target RAN.

In some embodiments, in the case that the type of handover indicates that a target HO cell is determined by a source cell based on HO request acknowledge considering the candidate configuration for TRF of each candidate cell, the second set of candidate configuration may include at least one candidate configuration of the TRF. That is, the PSMF determines at least one candidate configuration for the HO procedure and sends back to each of the candidate HO cell which is associated with a candidate configuration of the at least one candidate configuration. Then each of the candidate HO cell will perform admission control based on the candidate configuration and send the HO request acknowledge to the source cell of the UE. Then the source cell will select a target HO cell from the at least one candidate HO cell for the UE to perform HO.

Referring to FIG. 3, after determining the second set of candidate configurations of the TRF, in step 306, the PSMF may transmit the second set of candidate configurations of the TRF to the AMF. Then, in step 307, the AMF may transmit the second set of candidate configurations to the RAN node (e.g. a source BS or a candidate HO BS) which transmit the request message. Based on the type of handover, the source BS (cell) or the UE may select one configuration from the second set of candidate configurations to perform HO and TRF. The selected configuration of the TRF may indicate a target cell to which UE will perform the HO and indicate how to provide the TRF from the server of the EDN to the UE via the target cell.

To meet the demand (for example, latency requirement) for the expected task result feedback, a successive measurement of network status and task operation adjustment is required. That is, when the target HO cell is selected along with the associated configuration for TRF, the information should be reported back to PSMF and associated TMF(s) for the succeeding management of task operation. The associated TMF(s) may include source TMF in an EDN where the task is currently performed and/or target TMF(s) in END(s) to which the task will be transferred. The specific procedure may be illustrated in FIG. 7.

Figure 7:
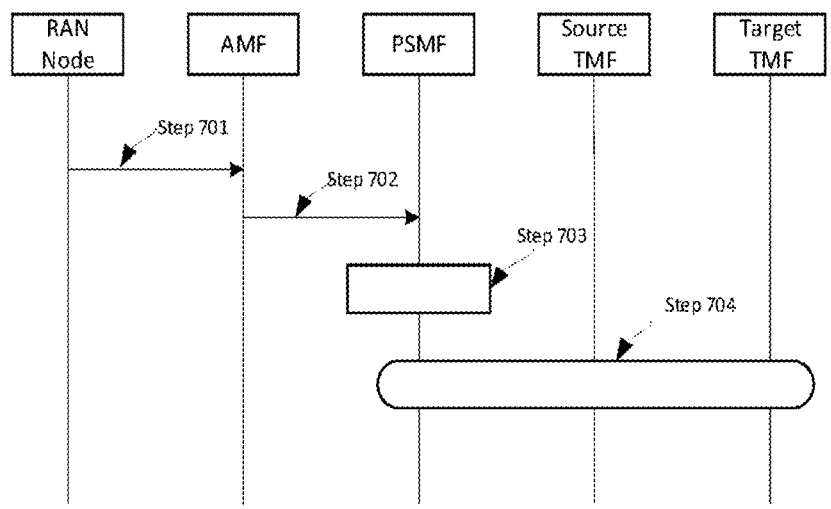
FIG. 7 is a flow chart illustrating a method for task management in NGNs according to some other embodiments of the present application.

FIG. 7 is a flow chart illustrating a method for task management in NGNs according to some other embodiments of the present application.

Referring to FIG. 7, after selecting a configuration of the TRF for the HO, in step 701, the RAN node may transmit a notification including the selected configuration of the TRF to the AMF. The selected configuration of the TRF may indicate a target cell (BS) to which UE will perform the HO and indicate how to provide the TRF from the server of the EDN to the target cell (BS). In some embodiments, the selected configuration of the TRF does not relate to task transfer from the EDN which currently performs the task (e.g., source EDN) to a new EDN (e.g., a target EDN). In some embodiments, the selected configuration of the TRF may involve a task transfer from the source EDN to at least one target EDN. The RAN node may be a source BS of the UE or the target BS to which the UE may perform HO.

In some embodiments, the notification is transmitted along with a path switch request message as specified in 3GPP standard documents.

In some embodiments, even if only one candidate configuration for the TRF is previously determined by the core network (e.g., PSMF), the RAN node will report the only one candidate configuration to the AMF to indicate a successful HO to target cell based on the candidate configuration determined by the core network.

After receiving the notification from the RAN node, in step 702, the AMF may transmit the notification to the PSMF.

After receiving the notification from the AMF, in step 703, the PSMF may update the field of configuration for the TRF in the task status of the task to include the selected configuration of the TRF.

Then, in step 704, the PSMF may transmit the selected configuration of the TRF to the source TMF and/or target TMF for further task management.

According to some embodiments of the present application, the selected configuration of the TRF does not relate to a task transfer to a target EDN, then the selected configuration of the TRF may be transmitted to the source TMF. In these embodiments, the detail procedure of the step 704 may be illustrated in FIG. 8.

Figure 8:
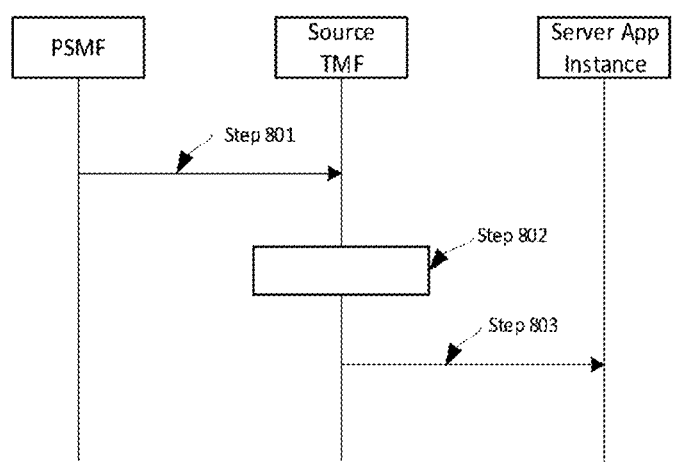
FIG. 8 illustrates a flow chart for task management without task transfer according to some embodiments of the present application.

FIG. 8 illustrates a flow chart for task management without task transfer according to some embodiments of the present application. The steps 801, 802 and 803 in FIG. 8 may be included step 704 of FIG. 7.

Referring to FIG. 8, in step 801, the PSMF may transmit the selected configuration of the TRF to the source TMF.

After receiving the selected configuration of the TRF, in step 802, the source TMF may update task status of the associated task and determine a task scheduling strategy based on the selected configuration. The task scheduling strategy may include at least one of: a priority of the task; a computing resource of the task; and a storage resource of the task.

If required, the TMF may obtain from the NWDAF the performance data associated with the selected configuration of the TRF. For example, in other to obtain the performance data from the NWDAF, the TMF may transmit a performance data request message to the NWDAF. The performance data request message includes the selected configuration of the TRF. After receiving the performance data request message, the NWDAF may transmit a performance data associated with the selected configuration of the TRF to the TMF. The obtained performance data may include at least one of: latency criteria of the selected configuration of the TRF; reliability criteria of the selected configuration of the TRF; and an application type of the task. In this case, the task scheduling strategy may be determined by further considering the obtained performance data.

In some embodiments, to guarantee the required QoS for the TRF, the TMF may keep tracking the performance data change for the selected configuration (e.g., routing) and adjust task scheduling strategy accordingly. Therefore, the TRF may check the NWDAF periodically to obtain the performance data associated with the selected configuration of the TRF before the end of the task.

After determining the task scheduling strategy, in step 803, the TMF may manage the associated task operation by applying the determined task scheduling on the task (or server app instance).

According to some other embodiments of the present application, the selected configuration of the TRF may relate to a task transfer to at least one target EDN, then the selected configuration of the TRF may be transmitted to the source TMF and at least one target TMF in the at least one target EDN. In these embodiments, the detail procedure of the step 704 may be illustrated in FIG. 9.

Figure 9:
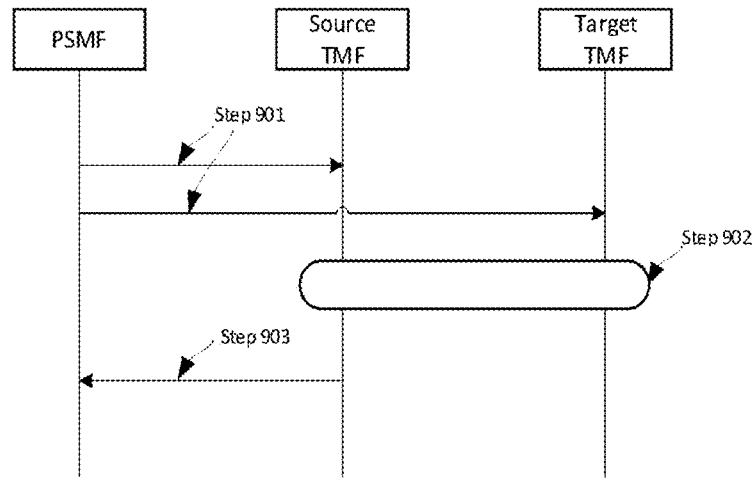
FIG. 9 illustrates a flow chart for task management with task transfer according to some embodiments of the present application.

FIG. 9 illustrates a flow chart for task management with task transfer according to some embodiments of the present application. The steps 901, 902 and 903 in FIG. 9 may be included step 704 of FIG. 7.

Referring to FIG. 9, in step 901, the PSMF may transmit a session establishment message to the source TMF and at least one target TMF in the at least one target END for task transfer. The session establishment message may be generated based on the selected configuration of the TRF. The session establishment message may indicate QoS requirements for the TRF to the UE.

For simplicity, only one target TMF is shown in the embodiments of FIG. 9. However, persons skilled in the art can understand that two or more target TMFs may be involved in some other embodiments of the present application. In these embodiments, steps 901, 902, and 903 may be performed per target TMF.

After receiving the session establishment message, in step 902, the source TMF and the target TMF may perform a session establishment procedure to generate a task transfer routing as indicated by the session establishment message.

In response to establishing the session successfully, in step 903, the source TMF may transmit a session establishment acknowledge to the PSMF indicating a successful session establishment between the source TMF and the target TMF.

After establishing the session, information of task may be exchanged between the source TMF and the target TMF prior to the task transfer via the task transfer routing. For example, the source TMF may transmit the information of task to the target TMF via the task transfer routing between the source TMF and the target TMF. The information of task may include at least one of: the selected configuration of the TRF associated with the task, QoS requirements for operating the task, and QoS requirements for the TRF associated with the task.

After receiving the information of the task, the target TMF may update a task queue of predicted tasks (e.g., the tasks which will be transferred to a target EDN where the target TMF locates) based on the information of task. In some embodiments, for all the tasks being performed on the server and all the tasks to be performed on the server (e.g., predicted takes), the TMF may maintain a task queue. In some other embodiments, the TMF may maintain a task queue for all of the predicted takes and maintain another task queue for all of the tasks being performed on the server. The TMF guarantees QoS of tasks by managing queue(s) of predicted tasks as well as existing tasks. The TMF guarantees QoS of tasks further by managing resource such as resource reservation mechanisms.

Figure 10:
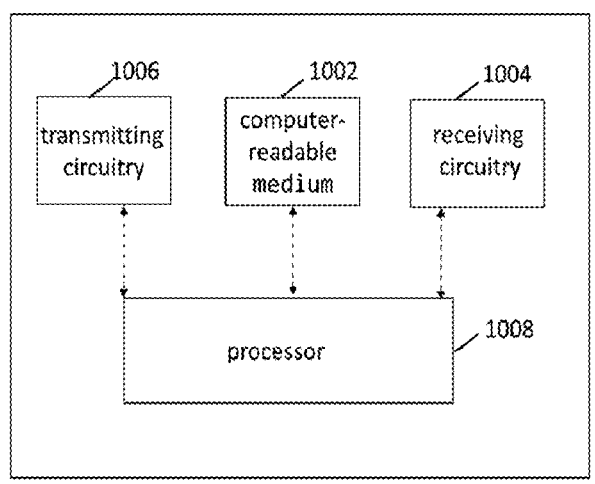
FIG. 10 illustrates a simplified block diagram of an apparatus for task management in NGNs according to some embodiments of the present application.

FIG. 10 illustrates a simplified block diagram of an apparatus for task management in NGNs according to some embodiments of the present application. The apparatus 1000 may be a RAN node, an AMF, a PSMF, a SMF, a NWDAF, or a TMF as shown in FIG. 1 or FIG. 2.

Referring to FIG. 10, the apparatus 1000 may include at least one non-transitory computer-readable medium 1002, at least one receiving circuitry 1004, at least one transmitting circuitry 1006, and at least one processor 1008. In some embodiment of the present application, at least one receiving circuitry 1004 and at least one transmitting circuitry 1006 and be integrated into at least one transceiver. The at least one non-transitory computer-readable medium 1002 may have computer executable instructions stored therein. The at least one processor 1008 may be coupled to the at least one non-transitory computer-readable medium 1002, the at least one receiving circuitry 1004 and the at least one transmitting circuitry 1006. The computer executable instructions can be programmed to implement a method with the at least one receiving circuitry 1004, the at least one transmitting circuitry 1006 and the at least one processor 1008. The method can be a method according to an embodiment of the present application, for example, the methods shown in FIGS. 3-9.

The method according to embodiments of the present application can also be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the flowcharts shown in the figures may be used to implement the processor functions of this application. For example, an embodiment of the present application provides an apparatus for task management in NGNs, including a processor and a memory. Computer programmable instructions for implementing a method for task management in NGNs are stored in the memory, and the processor is configured to perform the computer programmable instructions to implement the method for task management in NGNs. The method may be a method as stated above or other method according to an embodiment of the present application.

An alternative embodiment preferably implements the methods according to embodiments of the present application in a non-transitory, computer-readable storage medium storing computer programmable instructions. The instructions are preferably executed by computer-executable components preferably integrated with a network security system. The non-transitory, computer-readable storage medium may be stored on any suitable computer readable media such as RAMs, ROMs, flash memory, EEPROMs, optical storage devices (CD or DVD), hard drives, floppy drives, or any suitable device. The computer-executable component is preferably a processor but the instructions may alternatively or additionally be executed by any suitable dedicated hardware device. For example, an embodiment of the present application provides a non-transitory, computer-readable storage medium having computer programmable instructions stored therein. The computer programmable instructions are configured to implement a method for task management in NGNs as stated above or other method according to an embodiment of the present application.

While this application has been described with specific embodiments thereof, it is evident that many alternatives, modifications, and variations may be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the application by simply employing the elements of the independent claims. Accordingly, embodiments of the application as set forth herein are intended to be illustrative, not limiting. Various changes may be made without departing from the spirit and scope of the application.

What is claimed:

1. A method, comprising:
   receiving a request message for requesting a candidate configuration of a task result feedback (TRF) of a task associated with a user equipment (UE);
   transmitting a task status measurement and a reporting configuration to a first edge data network (EDN), the first EDN including a server to perform the task; and
   receiving a task status report associated with the task from the first EDN.

2. The method of claim 1, wherein the method is performed by a standalone predicted session management function (PSMF) or by a session management function (SMF).

3. The method of claim 1, wherein the request message includes at least one of:
   an identity (ID) of the UE;
   an ID of a session associated with the task;
   a cell ID of at least one candidate handover (HO) cell for the UE;
   a type field indicating a type of handover; or
   a maximum number of candidate configurations.

4. The method of claim 3, wherein the type of the handover indicates a target HO cell is determined by at least one of a predicted session management function (PSMF), a session management function (SMF), a source cell, the UE, or the source cell based on an HO request acknowledge considering the candidate configuration for the TRF of each candidate HO cell.

5. The method of claim 1, wherein the task status measurement and the reporting configuration indicates the task on the server to be measured, content included in the task status report, and a reporting criterion of the task status report.

6. The method of claim 1, wherein the task status report includes at least one of:
   a timestamp for the task status report;
   a time duration between the timestamp for the task status report and an end of the task; or
   one or more quality of service (QOS) requirements for the TRF, wherein the one or more QoS requirements include at least one of:
      a maximum requested time associated with reception of the TRF by the UE;
      a requested time duration associated with the reception of the TRF by the UE; or
      reliability for the TRF.

7. The method of claim 1, further comprising:
   transmitting a performance data request message for requesting a performance data, the performance data request message indicating at least one of a criterion for the TRF, requested information in the performance data, or a maximum number of information elements included in the requested information; and
   receiving the performance data including the requested information.

8. The method of claim 7, further comprising:
   determining a first set of candidate configurations of the TRF based on the performance data, wherein each of the first set of candidate configurations indicates how to provide the TRF on the task to the UE via a corresponding candidate handover (HO) cell.

9. The method of claim 8, further comprising:
   in response to the first set of candidate configurations not associated with a second EDN, determining a second set of candidate configurations based on the performance data, the task status report, and a type of handover indicated in the request message.

10. The method of claim 8, further comprising:
    in response to the first set of candidate configurations associated with at least a second EDN, and for each candidate configuration of the TRF in the first set of candidate configurations of the TRF which is associated with a corresponding second EDN:

transmitting a task transfer request message including information of the task to the corresponding second EDN associated with the candidate configuration;

receiving a task transfer response message from the corresponding second EDN; and determining a second set of candidate configurations of the TRF based on the performance data, the task status report, a type of handover indicated in the request message, and the task transfer response message from each second EDN.

11. An apparatus, comprising:

a processor; and a memory coupled with the processor, the processor configured to cause the apparatus to:

receive a request message to request a candidate configuration of a task result feedback (TRF) of a task associated with a user equipment (UE);

transmit a task status measurement and a reporting configuration to an edge data network (EDN) that includes a server to perform the task; and receive a task status report associated with the task from the EDN.

12. The apparatus of claim 11, wherein the apparatus implements a standalone predicted session management function (PSMF) or by a session management function (SMF).

13. The apparatus of claim 11, wherein the request message includes at least one of:

an identity (ID) of the UE;

an ID of a session associated with the task;

a cell ID of at least one candidate handover (HO) cell for the UE;

a type field indicating a type of handover; or a maximum number of candidate configurations.

14. The apparatus of claim 13, wherein the type of the handover indicates a target HO cell is determined by at least one of a predicted session management function (PSMF), a session management function (SMF), a source cell, the UE, or the source cell based on an HO request acknowledge considering the candidate configuration for the TRF of each candidate HO cell.

15. The apparatus of claim 11, wherein the task status measurement and the reporting configuration indicates the task on the server to be measured, content included in the task status report, and a reporting criterion of the task status report.

16. The apparatus of claim 11, wherein the task status report includes at least one of:

a timestamp for the task status report;

a time duration between the timestamp for the task status report and an end of the task; or one or more quality of service (QOS) requirements for the TRF, wherein the one or more QoS requirements include at least one of a maximum requested time associated with reception of the TRF by the UE, a requested time duration associated with the reception of the TRF by the UE, or reliability for the TRF.

17. The apparatus of claim 11, wherein the processor is configured to cause the apparatus to:

transmit a performance data request message for requesting a performance data, the performance data request message indicating at least one of a criterion for the TRF, requested information in the performance data, or a maximum number of information elements included in the requested information; and receive the performance data including the requested information.

18. The apparatus of claim 17, wherein the processor is configured to cause the apparatus to determine a first set of candidate configurations of the TRF based on the performance data, wherein each of the first set of candidate configurations indicates how to provide the TRF on the task to the UE via a corresponding candidate handover (HO) cell.

19. The apparatus of claim 18, wherein the processor is configured to cause the apparatus to, in response to the first set of candidate configurations not associated with a second EDN, determine a second set of candidate configurations based on the performance data, the task status report, and a type of handover indicated in the request message.

20. The apparatus of claim 18, wherein, in response to the first set of candidate configurations associated with at least an additional EDN, and for each candidate configuration of the TRF in the first set of candidate configurations of the TRF which is associated with a corresponding additional EDN, the processor is configured to cause the apparatus to:

transmit a task transfer request message including information of the task to a corresponding second EDN associated with the candidate configuration;

receive a task transfer response message from the corresponding second EDN; and determine a second set of candidate configurations of the TRF based on the performance data, the task status report, a type of handover indicated in the request message, and the task transfer response message from each additional EDN.

* * * * *